United States Patent [19]

Zebold et al.

[11] Patent Number: 5,412,512
[45] Date of Patent: May 2, 1995

[54] REMOTELY CONTROLLED MIRROR ASSEMBLY AND CONTROL SYSTEM THEREFOR

[75] Inventors: David F. Zebold, Katy; A. Wayne Mathes, Jr., Conroe, both of Tex.

[73] Assignee: Moto Mirror Inc., Arlington, Tex.

[21] Appl. No.: 18,685

[22] Filed: Feb. 17, 1993

[51] Int. Cl.[6] .............................................. G02B 7/18
[52] U.S. Cl. .................................. 359/878; 359/864; 60/567
[58] Field of Search ............... 359/872, 874, 876, 878, 359/864, 865; 60/536, 567, 571

[56] References Cited

U.S. PATENT DOCUMENTS

| | | | |
|---|---|---|---|
| 3,013,392 | 12/1961 | Falge et al. | 60/571 |
| 3,375,053 | 3/1968 | Ward | 359/864 |
| 3,407,601 | 10/1968 | Beck | 60/567 |
| 3,825,324 | 7/1974 | Brewington | 359/878 |
| 4,732,463 | 3/1988 | Mittelhauser | 359/878 X |
| 4,768,871 | 9/1988 | Mittelhauser | 359/876 X |
| 4,906,088 | 3/1990 | Casey | 359/872 |
| 4,918,920 | 4/1990 | Droux | 359/878 X |
| 5,058,385 | 10/1991 | Everett, Jr. | 60/571 |

*Primary Examiner*—Edward K. Look
*Assistant Examiner*—Michael S. Lee
*Attorney, Agent, or Firm*—Charles W. McHugh

[57] ABSTRACT

A mirror assembly for external use on large trucks, tractors, buses, etc. A first reflective surface is pivotably supported with respect to a large, shell-like housing in such a way that the surface is movable at will about two perpendicular axes. A powered hydraulic means is used for selectively rotating the reflective surface to a desired position and normally holding it in a static mode. The hydraulic means includes reservoirs in communication with two hydraulic cylinders, and a plurality of check valves arranged in sets and interposed between the reservoirs and the chambers in the cylinders. The hydraulic fluid is chosen from the group that comprises engine oil, power steering fluid, transmission oil and ethylene glycol. A person may manually grab the reflective surface and apply a torque to it which is sufficient to overcome the biasing resistance of the check valves, so the reflective surface may be manually moved to a desired position (to foster adequate visibility by a driver) even if the hydraulic means has become inoperative. Therefore, a tractor or truck need not be rendered inoperative for road travel just because the power for an external mirror is lost. A second reflective surface is affixed to a plate that supports the first reflective surface, so that the first and second reflective surfaces may be rotated as a unit, or one may be rotated without affecting the other.

42 Claims, 8 Drawing Sheets

REMOTELY CONTROLLED MIRROR ASSEMBLY AND CONTROL SYSTEM THEREFOR

BACKGROUND OF THE INVENTION

This invention relates generally to a mirror assembly having a reflective surface that is spatially adjustable so as to have its orientation changed by an operator who is located at a remote location with respect to the assembly; more specifically, the invention relates to a mirror assembly of the type that is commonly put on large vehicles (e.g., large trucks and buses) to serve as a selectively adjustable rearview mirror.

The problems associated with providing dependable rearview mirrors for large vehicles are well known. Such large vehicles include: buses; tractors of the type that are commonly used to pull semi-trailers (the combination often being referred to as "tractor/trailer rigs"); motor homes; and large trucks, e.g., class 8 trucks. Most of these large vehicles do not have rear windows through which a driver might obtain a direct line of sight to the rear of the vehicle. So whatever knowledge a driver obtains about conditions to the rear of the vehicle is obtained from looking at rearview mirrors. Because the number of such large vehicles on public roads is great, and the hazards associated with operation of such large vehicles are equally great, there have been many proposed solutions for providing drivers with improved vision to their rear, especially on the right side of the vehicle (when the steering wheel is on the left side). Examples of rearview mirrors which are selectively adjustable about a generally vertical axis are found in the following U.S. patents: U.S. Pat. Nos. 3,416,854 to Fykes titled "Remotely Adjustable Rear View Mirror With Pneumatic Operator"; 3,610,736 to Bateman titled "Power-Driven Rear View Mirror"; 3,815,365 to House titled "Control For Rearview Mirror"; and 3,830,561 to LaFave et al. titled "Remotely Operable Vehicular Mirror".

While some of the above-identified patents have proposed solutions that are better than fixed external mirrors, they do not address all of the problems that are faced by a driver who is attempting to maneuver a large vehicle in a confined area. Furthermore, changes in the average physical characteristics of truck drivers have introduced a requirement that is not new, but which is becoming more significant, namely, the physical size of drivers. Many trucking companies are now hiring female drivers—who are typically shorter than most males, and Oriental drivers—who are typically shorter than most Occidentals. The designers of trucks can no longer act on the assumption that the average truck driver will be about 5 foot, 11 inches in height and weigh 200 pounds, and then design a vehicle's cab to "fit" such a hypothetical person. And many driver teams are now made up of husbands and their wives, with the result that a rearview mirror adjusted to suit a husband's line of sight to the rear of a vehicle may not be appropriate for a shorter wife—who may also drive the vehicle. Prudence therefore dictates that a truly serviceable rearview mirror for trucks and the like must be capable of adjustment about a generally horizontal axis as well as a generally vertical axis.

The idea of providing a four-way mirror, i.e., one that can rotate in two directions about two orthogonal axes, is itself not new. Examples of proposed four-way mirrors can be found in the following U.S. patents: U.S. Pat. Nos. 4,639,103 to Hill titled "Remote Control Multi-Position Rear View Mirror"; and 5,082,361 to McKee titled "Horizontally and Vertically Movable Remote Controlled Mirror Unit For Commercial Vehicles". But while these patents may have taught that it is desirable to achieve movement in tour directions (i.e., right and left, up and down), they have not solved all of the problems associated with such movement. For example, the Hill patent teaches a mirror that is selectively movable to any one of four pre-selected positions, but it is impossible to achieve an intermediate location between any of the four fixed positions. The McKee patent identifies the benefits of a four-way mirror, but it does not explain how to achieve those benefits. That is, there is no teaching in McKee of what kind of drive mechanism might find utility in reaching the announced goal of producing an operable four-way mirror.

Furthermore, the four-way mirrors that have actually reached the marketplace do not have a good reputation for overcoming a major nemesis of mirrors on large vehicles, namely, vibration. The gross weight of 18-wheel tractor/trailer rigs can range from 30,000 to 100,000 pounds and have large Diesel engines that are capable of generating on the order of 450 horsepower at about 2100 to 2500 RPM. And the vibrations associated with such large vehicles when the engine is running can be enough to render an image in an external mirror so "bouncy" as to make it useless to a driver. Besides being severe in the short term, vibrations associated with a vehicle engine and road conditions can also be problematical because of their duration. It is not unusual for a long-haul driver to put 250,000 miles per year on a tractor that is pulling trailers across the country on interstate highways. It is therefore a goal of this invention to provide a crisp, stable image in a remotely controlled mirror, which mirror is capable of being selectively rotated about at least one axis and preferably two orthogonal axes.

It is probably worthy of mention that automobile mirrors have been around for quite some time, and for several years there have been electro-mechanical mirrors that are capable of being pivoted about two orthogonal axes. But there are two major factors that preclude the direct transfer of successful automobile technology to trucks, namely, weight and geometry. Many truck mirrors utilize a piece of flat glass that is 7" by 16", which makes them about three times larger than even the biggest automotive mirrors. And with the increase in size there is, of course, a concomitant increase in weight. Also, truck mirrors are traditionally mounted on C-shaped brackets in which two generally horizontal arms extend outwardly from a truck cab for distances ranging from 10" to 20". These two horizontal arms are required to support a vertically oriented mirror assembly between them at their distal ends: and a force analysis on such a construction would almost be equivalent to that of two cantilevered beams that are holding a heavy weight between them. Therefore, the typical mounting system for a truck mirror tends to behave like a heavy mass suspended between two springs; and the truck vibrations that are generated both at idle and when travelling tend to produce vibrations in the mirror-mounting system that can be so severe as to interfere with any beneficial use of the mirror. It is therefore an object of this invention to provide an improved mirror assembly for large trucks, etc., that is capable of providing stable images that provide meaningful information to a driver.

Still another object is to provide a mirror that is capable of being manually adjusted by a driver by simply pushing on the reflective surface—in the event that a power-assisted mechanism (which is normally used to adjust the mirror's orientation) becomes inoperative. Those skilled in the art will recognize, of course, that this is a commendable goal, because the laws of many states require that rearview mirrors must be serviceable before a truck can be moved on a state's highways. So if a failure should occur in the power mechanism, and the truck was being inspected at one of the many truck inspection stations along our highways, at least the driver could continue on his run. He would only need to manually place the mirror where it will do what old-fashioned, fixed mirrors have done in the past, namely, provide a fixed field of view to the driver with regard to the rear of the truck or trailer. And pushing directly on the reflective surface to correctly orient the mirror will not cause damage or breakage of any internal pans of the power mechanism.

A further object is to provide a power-assisted arrangement for adjusting remote-controlled mirrors with hydraulics, but which uses a system that does not remain pressurized when adjustment of the mirror's orientation is not taking place.

One more object is to provide a four-way mirror that is capable of being moved to almost an infinite number of positions between full right and full left, and between full up and full down.

These and other objects will be apparent from a careful reading of the specification and the concluding claims, together with reference to the several figures of the drawing that are provided herewith.

BRIEF DESCRIPTION OF THE INVENTION

Figure 1:
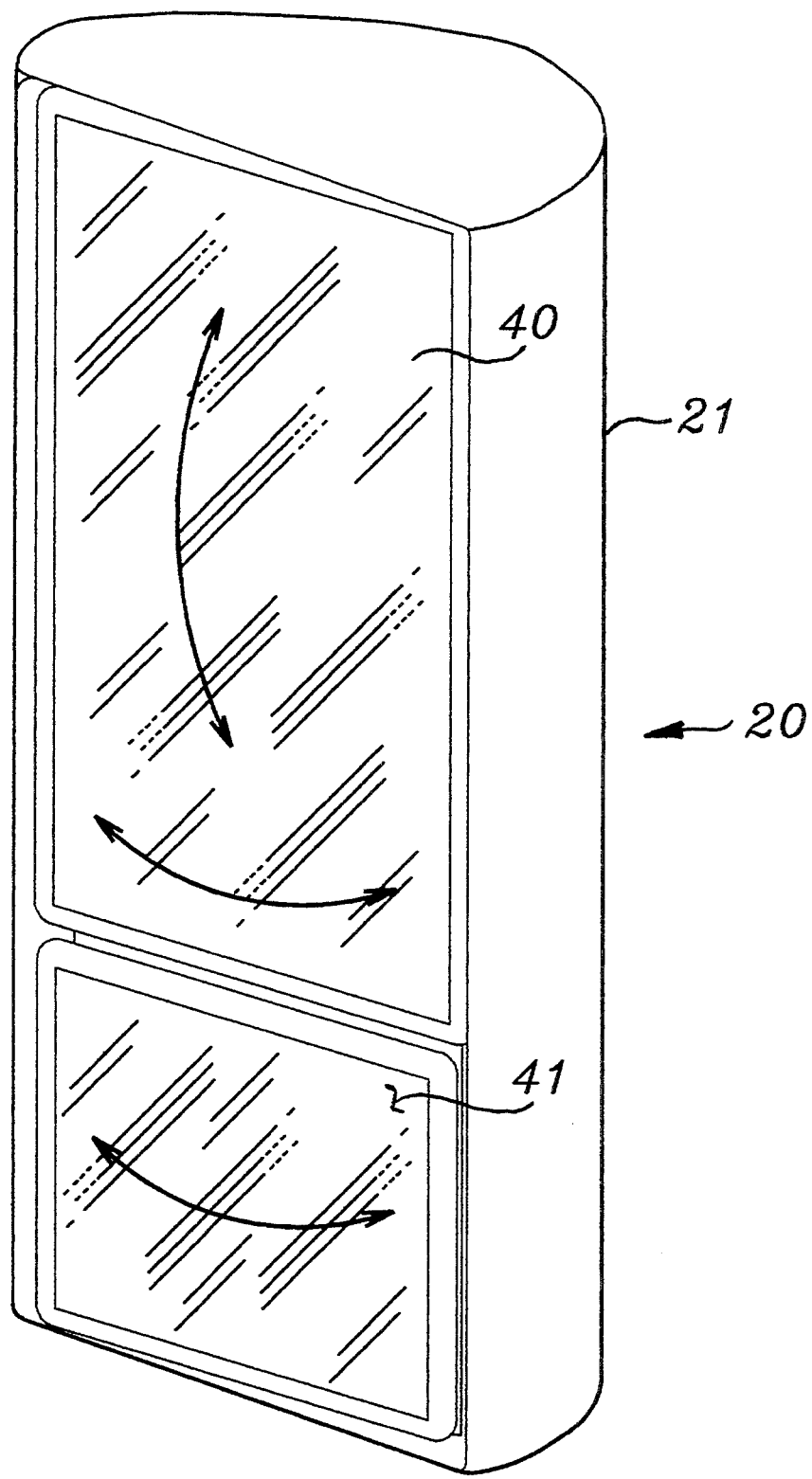
FIG. 1 is a perspective view of a preferred embodiment of the invention in which an hydraulically operated system is used to selectively move a large exterior mirror assembly of the type commonly used on large wheeled vehicles.

In brief, the invention may be described as a mirror assembly that is adapted for remote control by an operator who is positioned within or on some large structure, such as a large vehicle. Common places where such a mirror assembly might find utility include: road vehicles, boats, trains and other rail-supported vehicles, and heavy equipment such as overhead cranes. With regard to road vehicles, which may have the greatest need for improved visibility, the most likely places for use of the mirror assemblies involve buses, motor homes, class 8 trucks and the tractors that are designed to pull one or more large trailers.

A mirror assembly in accordance with this invention will include some kind of a structural base that is configured for attachment to the exterior of the vehicle or other structure to which the assembly is to be mounted. Using the cab of a tractor as an exemplary structure for most of the description that follows, a structural base can be a major part of an aerodynamically shaped housing that is attached to the exterior of the cab in the manner of existing truck mirrors. A generally planar member is mounted for rotation with respect to the structural base. It will usually be helpful to think of the structural base as "fixed" and the generally planar member as "movable," even though both may often be traveling together down a highway at about 65 miles per hour. The generally planar member has mounted thereon a reflective surface that is oriented to serve as a rearview mirror for the vehicle's driver. The reflective surface may be of a conventional size for truck mirrors, i.e., about 7 inches wide by 16 inches tall, or it may be larger or smaller.

A first hydraulic cylinder is mounted so that it extends between the structural base and the generally planar member. The hydraulic cylinder is conventional in the sense that it has a barrel, a movable piston that divides the interior of the barrel into two chambers, and a piston rod that extends outwardly from the forward end of the barrel. A first reservoir of hydraulic fluid is in communication with one of the two chambers in the first hydraulic cylinder, and a second reservoir of hydraulic fluid is in communication with the other chamber. Some means is provided for selectively pressurizing a given one of the two reservoirs, in order to cause movement of the piston and its associated rod—to thereby rotate the generally planar member about a first axis. Exemplary means include electrically driven pumps, a compressed gas such as air, etc. After the generally planar member has been moved so that it has a desired orientation with respect to the structural base, the pressure in the reservoirs is released and the reservoirs return to atmospheric pressure; this reduces the risk that a leak in the hydraulic system might occur someday and render the adjustment system inoperative.

In order to keep the generally planar member stable and leave the reflective surface with a desired orientation after the reservoirs have been returned to atmospheric pressure, the conduits between the cylinder's two chambers and the two reservoirs are made relatively small. By using an incompressible liquid as the operative fluid in the system and using small conduits, the flow of liquid to and from the chambers of the cylinder is effectively inhibited, thereby serving as a damping means to preclude unwanted movement of the generally planar member when it is ostensibly at rest. An enhanced and preferred manner of achieving damping of the generally planar member involves use of a pair of check valves that are installed where they will be in communication with one of the two reservoirs. The two check valves are in parallel but oriented oppositely, such that they respectively restrict the flow of hydraulic fluid in opposite directions. A convenient location for the check valves is in one of the two reservoirs, where the check valves will be immersed in whatever liquid has been selected to operate the system. A preferred liquid is one that can be readily found at essentially all truck stops and garages throughout the country, e.g., power steering fluid, automatic transmission fluid, motor oil (also called engine oil), and antifreeze (ethylene glycol). Of these possible liquids, ethylene glycol is preferred.

In a more elaborate embodiment of the invention, a pivotal plate carried by the generally planar member can be made to rotate with respect to the generally planar member about a second axis. The second axis is advantageously oriented so that it is approximately perpendicular to the first axis; and it will usually be in a plane that is close to, or in a plane that contains, the first axis. So if the first axis is vertical, the second axis will be approximately horizontal—and typically close to the bottom of the generally planar member. By mounting a reflective surface on the pivotal plate, the reflective surface is capable of simply traveling with the generally planar member as it rotates, or pivoting with respect to the generally planar member. To achieve the last-mentioned pivoting, a second hydraulic system is provided, with its own hydraulic cylinder and two associated reservoirs. When one of the two chambers in the second hydraulic cylinder is pressurized, the plate will be caused to rotate about the second axis, regardless of the position of the generally planar member. Hence, with this dual-cylinder system, an operator may cause the reflective surface to move right or left, in or out, or any combination of these movements, to achieve an essentially infinite number of possible positions. Of course, in or out movement of the reflective surface has the optical effect of moving the field of view in the reflective surface up or down. So such a mirror assembly may be aptly described as a right/left and up/down mirror, or, more simply, a four-way mirror.

When space permits, it is advantageous to attach a second reflective surface to the generally planar member, so as to be rotatable about at least one axis. The second reflective surface can be shaped differently, e.g., it can be given a convex shape, while the first reflective surface is planar. In the preferred embodiment, the first reflective surface is planar and is rotatable about both a vertical and a horizontal axis, but the second reflective surface rotates only about a vertical axis.

DETAILED DESCRIPTION OF A PREFERRED EMBODIMENT OF THE INVENTION

Figure 2:
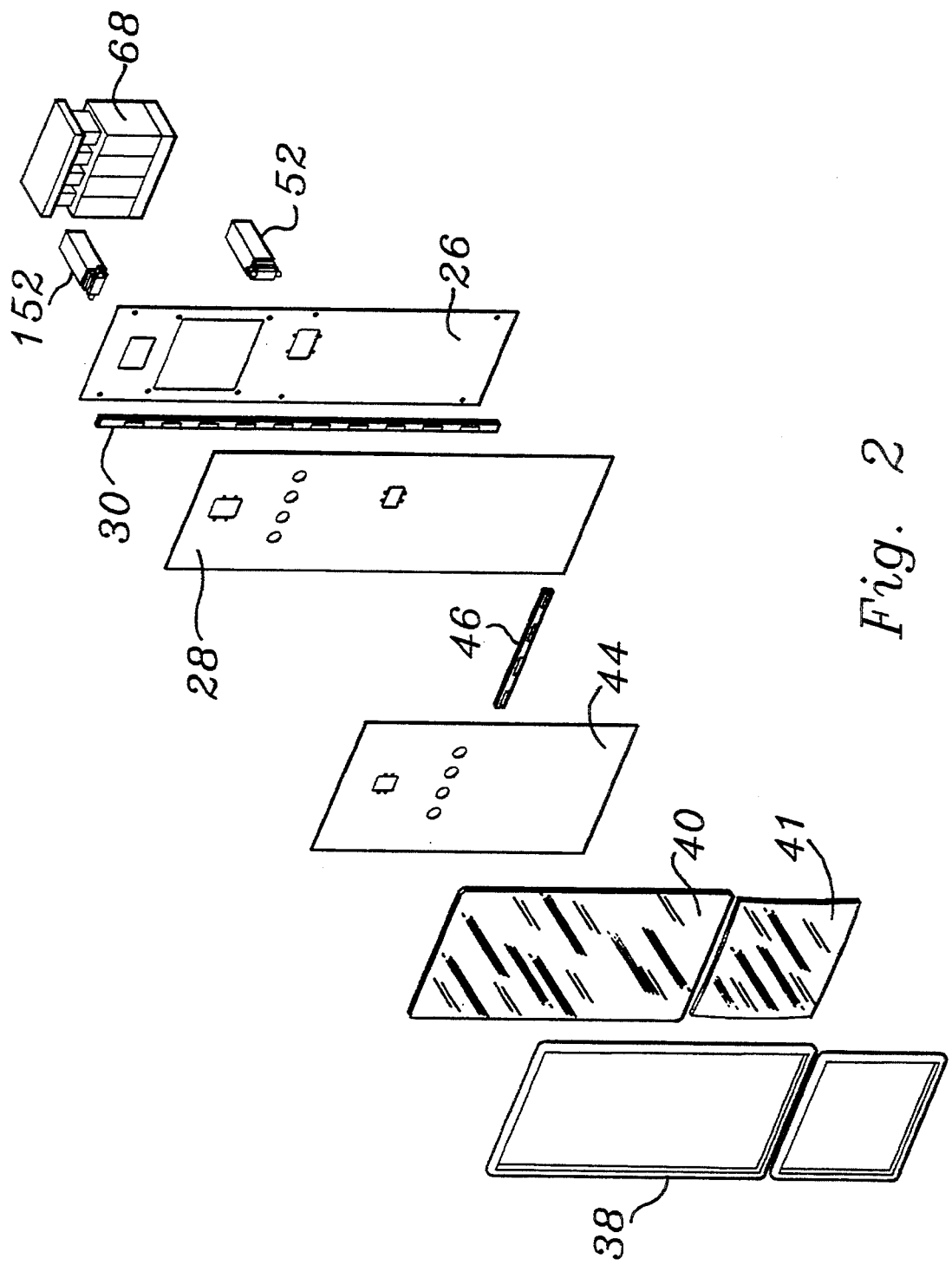
FIG. 2 is an exploded view of the mirror assembly shown in FIG. 1, but with the aerodynamic shell around the back of the assembly being omitted (for clarity)
Figure 3:
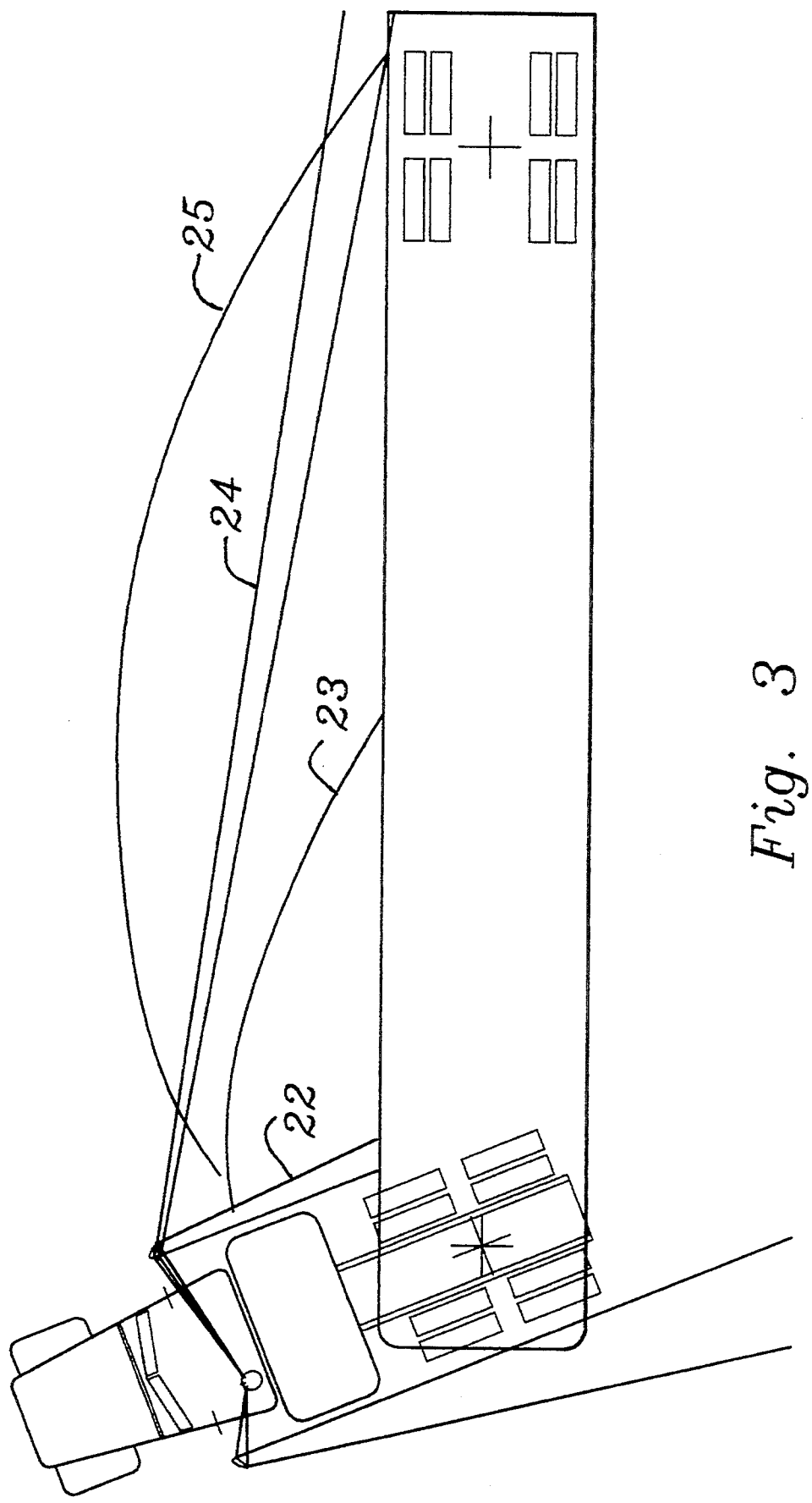
FIG. 3 is a top plan view showing a tractor/trailer rig in essentially a schematic manner, and illustrating the increased visibility that is made possible by providing a mirror assembly that is adjustable—outwardly—with respect to the tractor on which the assembly is mounted.

Referring initially to FIGS. 1 and 2, a mirror assembly 20 is configured as an external rearview mirror for attachment to the cab of a large wheeled vehicle, e.g., the tractor of an 18-wheel tractor/trailer combination. Such mirror assemblies 20 are useful on both the driver's side and the passenger's side of such a truck cab. But they are more beneficial on the right side (when the steering wheel is on the left side of the cab), because there are more so-called "blind-side" accidents that occur on the right side of a vehicle. Referring additionally to FIG. 3, it will be seen that turning a tractor to the right will cause a fixed mirror to provide a field of view to the driver that is essentially useless, because the driver will only see the frontal portion of the right side of the trailer. The outside edge of the field of view of a rigidly mounted (flat) mirror is identified in FIG. 3 by the line 22. A convex mirror will provide vision inside of arc 23. By rotating a mirror outwardly, the field of view can be changed so that the driver can see spatial relationships between the rear of the trailer and adjacent objects. This expanded field of view is represented by the boundary line 24 for a flat mirror, and arc 25 for a convex mirror. Thus, an adjustable mirror permits a truck driver to have a field of view that he or she would not otherwise have—either with a fixed outside mirror or with a direct line of sight.

Referring once again to FIGS. 1 and 2 it will be understood that the aerodynamic shell 21 that surrounds the operative elements of the assembly 20 has been eliminated from the "exploded" view of FIG. 2. But it will certainly be appreciated that the shell 21 constitutes a generally cavernous housing that can envelop and protect those parts of the assembly 20 that do not need to be seen. Depending on its size, suspension of the shell 21 in a static manner alongside a cab can be accomplished with a conventional C-shaped bracket of the type that is commonly used with so-called West Coast mirrors, or by some other structural means. The particular suspension of the shell 21 does not constitute a part of this invention, and hence mounting bolts and the like that would normally be illustrated have been omitted—to promote simplicity in the drawing.

Figure 4:
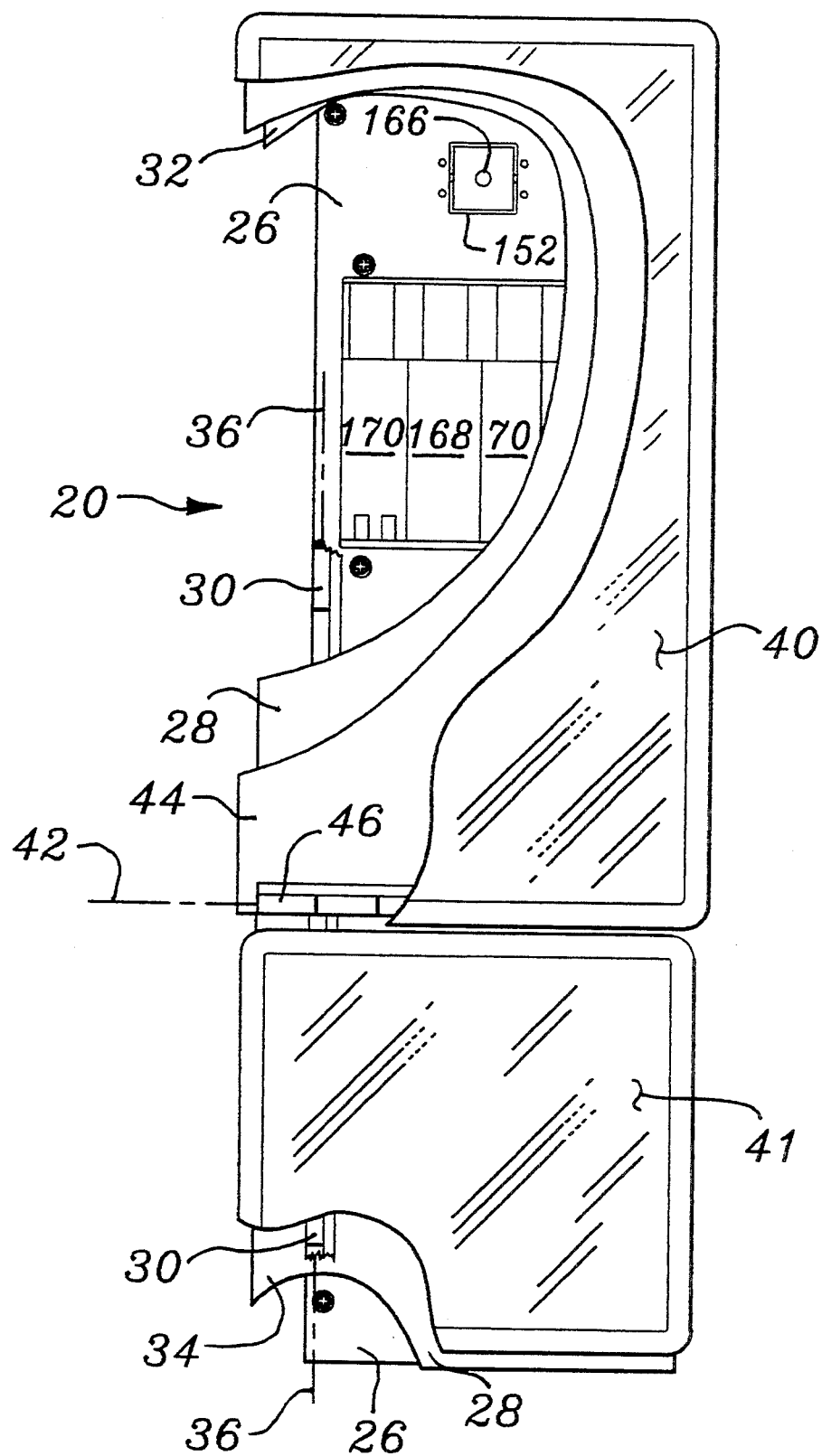
FIG. 4 is a front elevational view of the mirror assembly shown in FIG. 1, with the front of the assembly including the reflective surface into which a driver would look when trying to observe objects behind the tractor.
Figure 5:
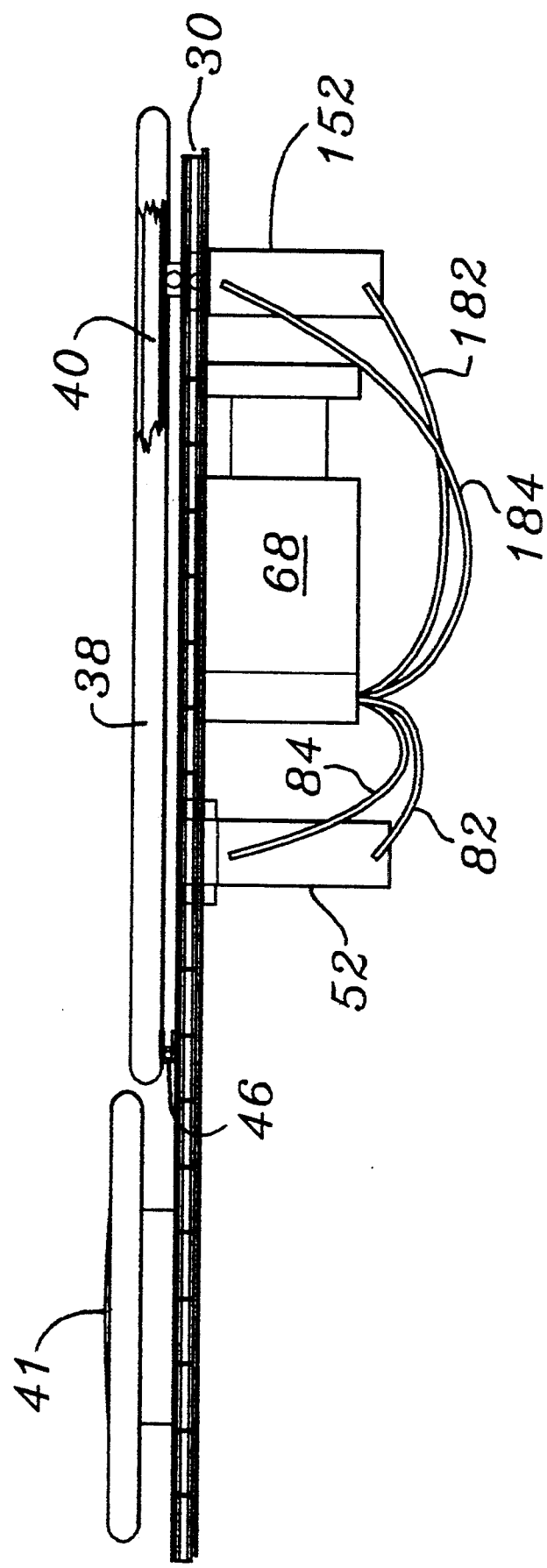
FIG. 5 is a side elevational view of the mirror assembly shown in FIG. 1.
Figure 6:
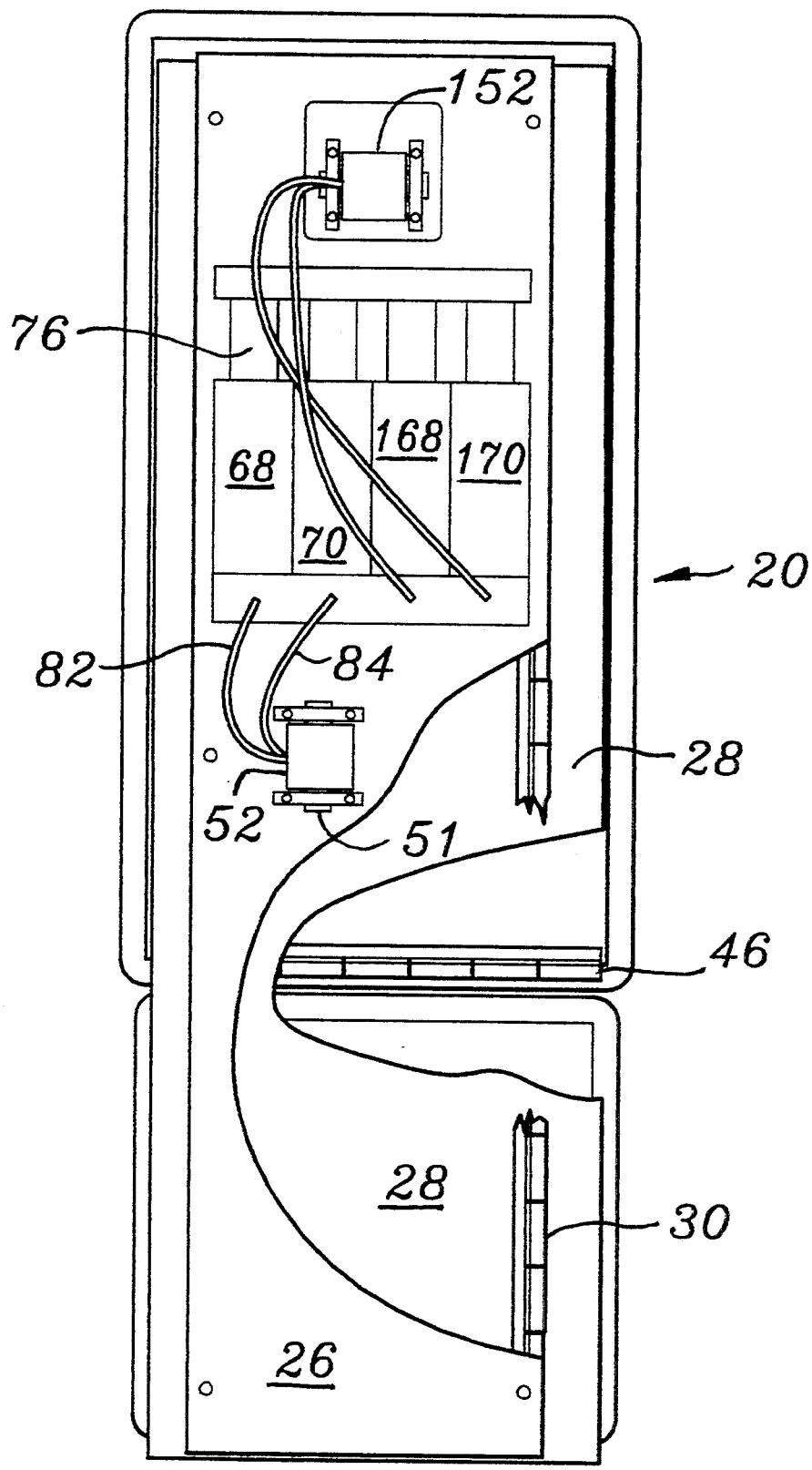
FIG. 6 is a rear elevational view of the mirror assembly shown in FIG. 1.

With additional reference to FIGS. 4, 5 and 6, the mirror assembly 20 has a structural base 26 that is configured for rigid attachment in a generally vertical orientation to one or the other sides of a tractor cab. A generally planar member 28 is rotatably mounted on the structural base, preferably with a hinge device 30 that essentially spans the distance from the top of the member to the bottom thereof. Such a hinge device 30 may be a continuous hinge member—like a piano hinge, or the device may consist of two or more short and widely separated elements that are carefully aligned so that their pivot axes are exactly aligned. FIGS. 4, 5 and 6 show the preferred embodiment in which a continuous hinge 30 extends along one side of the member 28, from its top 32 to its bottom 34, providing an excellent degree of stability for the member 28. Illustrated is a mirror assembly for the left side of cab; and it will be understood that a right-side assembly would be arranged oppositely, such that the pivot axis 36 will be away from the cab. Those skilled in the art will recognize, of course, that parts for a right-hand and a left-hand mirror can be essentially the same, but many parts will be oriented differently when they are being assembled in the factory. Hence, a driver who is ordering a replacement for a broken mirror assembly will naturally specify that he/she needs a right-hand or a left-hand mirror assembly.

Mounted on and carried by the generally planar member 28 is a reflective surface 40 which will normally be a piece of high-quality plate glass that has been silver plated or chrome plated on its back side. A suitable piece of glass is one that is about $\frac{1}{8}$ to $\frac{1}{4}$ inch thick and approximately 7 inches wide and 14 inches tall; such a piece of glass will typically weigh about 1 to 2 pounds. This weight is significantly more than the weight of the reflective surface of a typical automotive mirror, which is one reason that the technology that has been developed for automotive mirrors cannot simply be transferred to truck mirrors, etc.

If a designer is only interested in producing a two-way mirror, i.e., one that rotates fight or left about a vertical axis, the mounting of the reflective surface 40 on the generally planar member 28 can be a hard mounting. In such a case, the relative positions of the generally planar member 28 and the reflective surface 40 would never change, once the reflective surface was installed. But it is believed that an optimum mirror assembly is one that permits rotation of a reflective surface about two generally perpendicular axes; and such an assembly is shown in FIGS. 1 and 2. Rotation of the reflective surface 40 about an axis 42 (that will be generally horizontal when axis 36 is vertical) is made possible by providing a plate 44 that is pivotably attached to the generally planar member 28 with a hinge 46, said hinge being fixed to the lower part of the generally planar member. The reflective surface 40 is then held to the outer surface of plate 44 with a peripheral rubber "frame" 38 (somewhat like a giant O-ring with a molded groove on the inside) or with simple brackets (held with nuts and bolts), so that the surface will move with the plate when the plate rotates. Because the plate 44 is pivotably held at its bottom, any movement must of necessity be accomplished by swinging the top inward or outward (with respect to the mirror housing). This could be accomplished with a mechanical linkage or a motor-driven screw, but it is preferably accomplished by a hydraulic system similar to the system that rotates the generally planar member 28—described hereinafter.

Interviews with drivers and visibility studies have revealed that there is a more frequent need for a downward adjustment of the field of view in a mirror than for an upward adjustment. This is because a driver will more often need to see where the rear wheels of a long truck or a trailer are positioned (with respect to a curb or a fireplug, etc.) than to see whether the top of the vehicle will clear an overhanging sign or awning. For this reason, it is preferred that there be a greater movement of top of the plate 44 forward than backward—away from a nominal "driving" position, which will be essentially vertical. Hence, a "downward" rotation of about 5 degrees (in a forward direction about axis 42) is preferred, while an "upward" rotation of about 2 degrees from the mirror's nominal position will usually be adequate.

Figure 7:
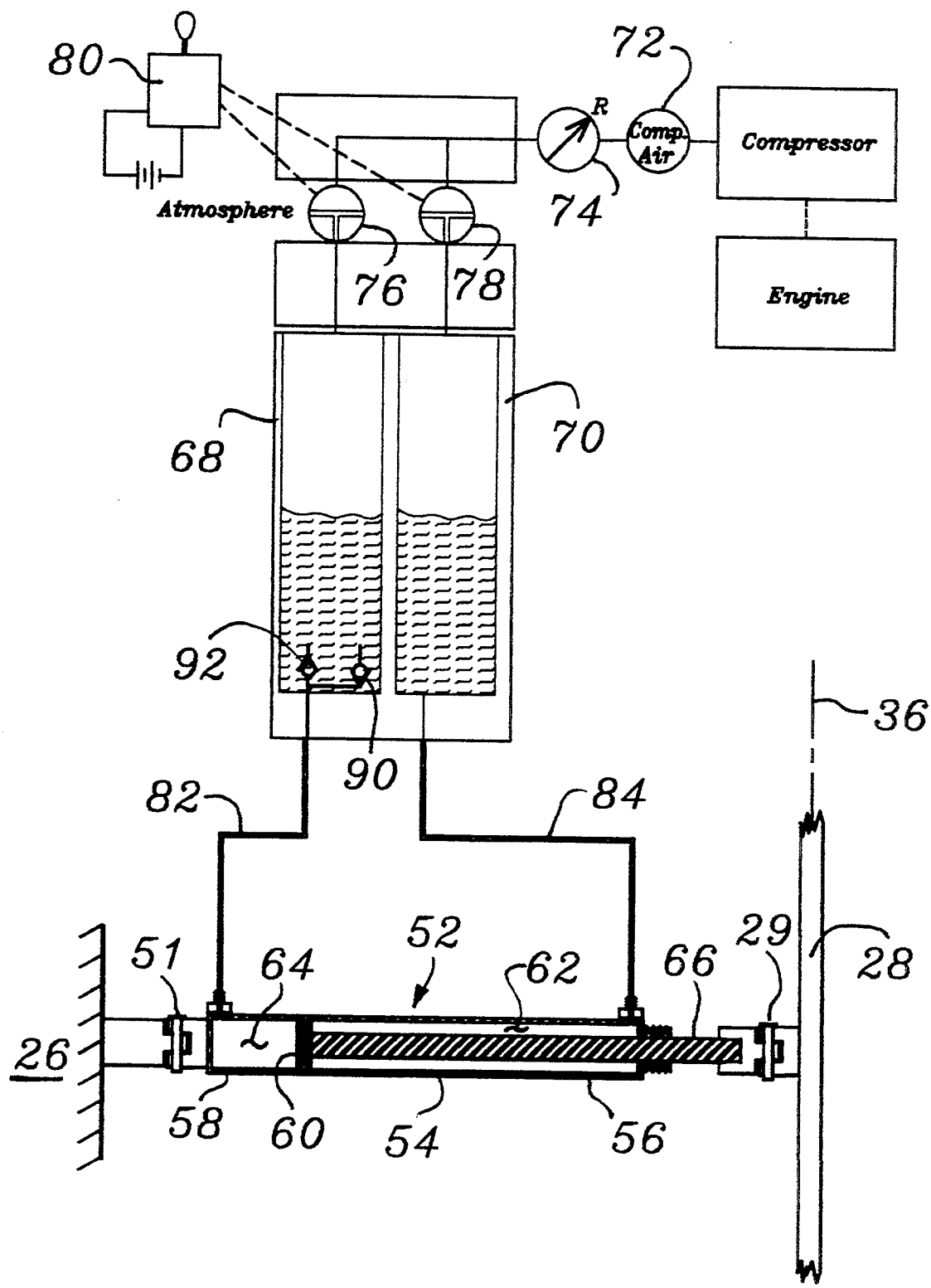
FIG. 7 is a schematic and simplified showing of an hydraulic cylinder of the type that is used to quickly and dependably move the pivotable parts of the mirror assembly shown in FIG. 1.

With attention now being directed to the hydraulic system for an optimum mirror assembly, it will perhaps be useful to initially consider only a portion of the preferred system, so that some basic features can be discussed without having to simultaneously deal with too many structural details. Turning then to FIG. 7, there is shown in a mostly schematic manner a first hydraulic cylinder 52 that extends between the structural base 26 and the generally planar member 28. The cylinder 52 is conventional and has a barrel 54, a front end 56 and a rearward end 58. Slidably movable within the barrel 54 is a piston 60 that divides the barrel's interior into forward and rearward chambers 62, 64. A piston rod 66 is attached (at its pendant end) to the piston 60, and extends outwardly from the barrel's forward end 56. The orientation of the cylinder (as defined by whether the piston rod extends to the right or the left) is not critical. But the entire assembly is more orderly if the barrel 54 is attached to the structural base 26 and the distal end of the piston rod 66 is attached to the generally planar member 28. Also, the hydraulic cylinder 52 is positioned directly behind the generally planar member 28, so that extension and retraction of the piston rod 66 will cause the generally planar member to pivot about first axis 36. To accommodate the changes in relative position as the piston rod 66 extends and retracts, it is useful to provide yokes, pins or other pivotable connections at the anchored end of the barrel and the distal end of the piston rod. The anchored end of the barrel pivots with respect to base 26 about the axis of pin 51, and the distal end of piston rod pivots with respect to member 28 about the axis of pin 29.

Because axis 36 is generally vertical (in this embodiment), the cylinder 52 will be oriented so as to be generally horizontal at all times, as long as there is sufficient travel of the piston rod to achieve the desired range of rotation of the reflective surface 40. By placing the pivot axis of the generally planar member 28 near one of its edges, the cylinder 52 can be placed near the center of the generally planar member and achieve a rotation of about 30 degrees by extending the piston rod 66 a distance of two inches. Of course, rotating the generally planar member 28 also rotates anything that is carried by the member, including the reflective surface 40.

When it is desired to rotate the generally planar member 28, there must be some way of increasing the pressure in one of chambers 62, 64 and keeping the pressure in the other one low. In the preferred embodiment both of the chambers 62, 64 are normally kept at essentially atmospheric pressure by keeping them in communication with reservoirs 68, 70 that are at atmospheric pressure. Communication is preferably accomplished with vinyl tubing having a nominal size of ⅛ inch, which provides a flow passage having an internal diameter of about 0.050 inch. A given one of the reservoirs is then pressurized with a pump or the like, while the other is left in its ambient state. The preferred manner of pressurizing a respective one of the reservoirs is to place it in temporary communication with a source of gaseous fluid—such as a tank 72 of compressed air on a tractor or truck. Such air tanks are customarily provided on large trucks and routinely maintained at about 80–120 pounds per square inch (psi) of pressure by an engine-driven air compressor on the truck/tractor; but only about 20 to 30 psi is usually needed to pressurize a typical hydraulic cylinder. Hence, a regulator 74 is advantageously used to drop the air pressure that is admitted to a respective reservoir to about 25 psi.

A normally-off/momentarily-on solenoid valve is placed in a supply line between the air source 72 and each of the reservoirs. In FIG. 7 the two valves 76, 78 are shown in conduits where they can cause reservoirs 68, 70 to be selectively pressurized. An electrical switch 80 positioned at a remote location (adjacent the driver) is used to momentarily turn one of the two solenoid valves 76, 78 to its open position, thereby allowing pressurized air (at about 25 psi) to enter an associated reservoir. The chamber associated with the pressurized reservoir will, in turn, become pressurized, causing the piston to move in the direction of the other (unpressurized) chamber. Thus, turning valve 76 to its "on" position will pressurize reservoir 68 and rear chamber 64, causing the piston 60 to move to the right—to an essentially infinite number of possible positions, because front chamber 62 is still at atmospheric pressure. Of course, the piston rod 66 will move also, thereby causing the generally planar member 28 to be rotated about its axis 36 in proportion to the amount of piston movement.

The speed of movement is established by design choices that are made in the system. Tests have shown that moving about 0.375 cubic inches of liquid in about 8 to 10 seconds will produce a movement of the reflective surface that is fast enough to be useful but not so fast as to cause the driver to become confused with a rapidly moving (i.e., blurred) image.

When switch 80 has been restored to its neutral position, the solenoid valves will cause both reservoirs 68, 70 to be in communication with the atmosphere. The two chambers 62, 64 will also be at an essentially equal pressure, which will be essentially atmospheric. If either of the chambers is at a pressure that is just slightly higher than atmospheric, it will be because of the head that is established by the difference in elevation of the liquid in a reservoirs (above the chambers) and the liquid in its associated chamber. As long as the conduits 82, 84 that connect the chambers 64, 62 to the reservoirs are relatively small, any external force that is applied to the member 28 will be resisted by the inability of the liquid to move quickly through the narrow conduits. But it is preferred to increase the damping effect of the air-over-liquid system being disclosed herein by adding two check valves 90, 92 between one of the reservoirs and its associated chamber. In the embodiment illustrated in FIG. 7 the check valves are inserted between chamber 64 and reservoir 68. The two valves 90, 92 are in parallel conduits but they are oppositely oriented, so that one will permit liquid flow in one direction (when the biasing force of a spring-biased ball is overcome), while the other permits flow in the opposite direction.

Because both reservoirs 68, 70 are maintained at atmospheric pressure, all that is necessary is that there be a single set of check valves in communication with one of the two reservoirs. As long as one of the two reservoirs is provided with check valves, the choice of which one does not affect their operation. They may be positioned eternally of the reservoir with which they are associated; but it is preferred that they simply be placed inside a reservoir, such that they will be immersed in the liquid at all times. A suitable check valve for an application like this is a No. 05-03-01-X brass check valve that is available from ADI Corporation in Newberg, Oreg. Such check valves have 10/32 inch inlet and outlet threads, a cracking (or opening) pressure of 3 psi, and an air flow rate of 2.5 SCFM at 50 psi. While the absolute rating of such valves may not seem high, the valves 90, 92 are usually quite effective in resisting those external forces that are applied to the generally planar member 28 by wind loads, engine vibration, etc.

In an hydraulic system with two oppositely oriented check valves, it would be entirely feasible for a truck driver to adjust the orientation of the reflective surface 40 without relying on the powered system. This would be done by manually grabbing the generally planar member 28 and applying a twisting torque to it, and it would not cause any damage to the system. Thus, if the member 28 is manually rotated in a direction that causes piston 60 to move to the left, the pressure in rear chamber 64 will increase until check valve 90 opens and allows the passage of at least some of the liquid out of the chamber and into reservoir 68. No vacuum is created in front chamber 62, of course, because it is in direct communication with reservoir 70 which is at atmospheric pressure; so movement of piston 60 to the left increases the size of chamber 62, but it is kept full by receiving additional liquid from reservoir 70. Conversely, applying a twisting torque to the member 28 in an opposite direction will cause the piston 60 to move to the right. Additional liquid will then flow through check valve 92 and into chamber 64 as the piston continues to move. An advantage of this ability to manually position a member 28 (and its associated reflective surface) is that a truck driver need not be stranded on a road somewhere if there should happen to be some kind of failure in the powered system for selectively positioning a reflective surface. By simply parking his/her truck, the driver can always push on the reflective surface in order to put it where it needs to be in order to provide the kind of "fixed" visibility that was standard in the industry for many years before rotatable mirrors became available. And after the truck has been driven to a service facility, the original failure in the powered system can be repaired without having to worry about any complication that may have arisen by manually forcing the reflective surface to a desired orientation.

Besides enabling a truck driver to manually position a reflective surface without causing any harm to the power system that is normally used to adjust a mirror's position, there are two other situations in which the hydraulic system disclosed herein is advantageous. The first situation can arise when a driver is trying to back a trailer into a very narrow slot, and the protruding mirror comes into contact with an adjacent trailer that parked alongside. The hydraulic system with check valves as disclosed herein effectively provides the function of a slip clutch between an external mirror and the power system that is intended to cause mirror rotation. That is, bumping into an immovable obstacle with an external mirror is not ruinous when the oppositely oriented check valves are present to relieve pressure and allow mirror movement. A second situation can arise if vandals decide to climb up on a cab's exterior and deliberately twist the external mirrors on a parked truck. Without the "break-away" benefit of the relief valves 90, 92 (or an equivalent mechanical clutch), a vandal can do a great deal of damage to a powered mirror system even while remaining outside the truck's cab. The pair of oppositely oriented check valves also strengthen the damping effect of the hydraulic system on mirror vibrations that have their origins in engine operation and road travel.

Figure 8:
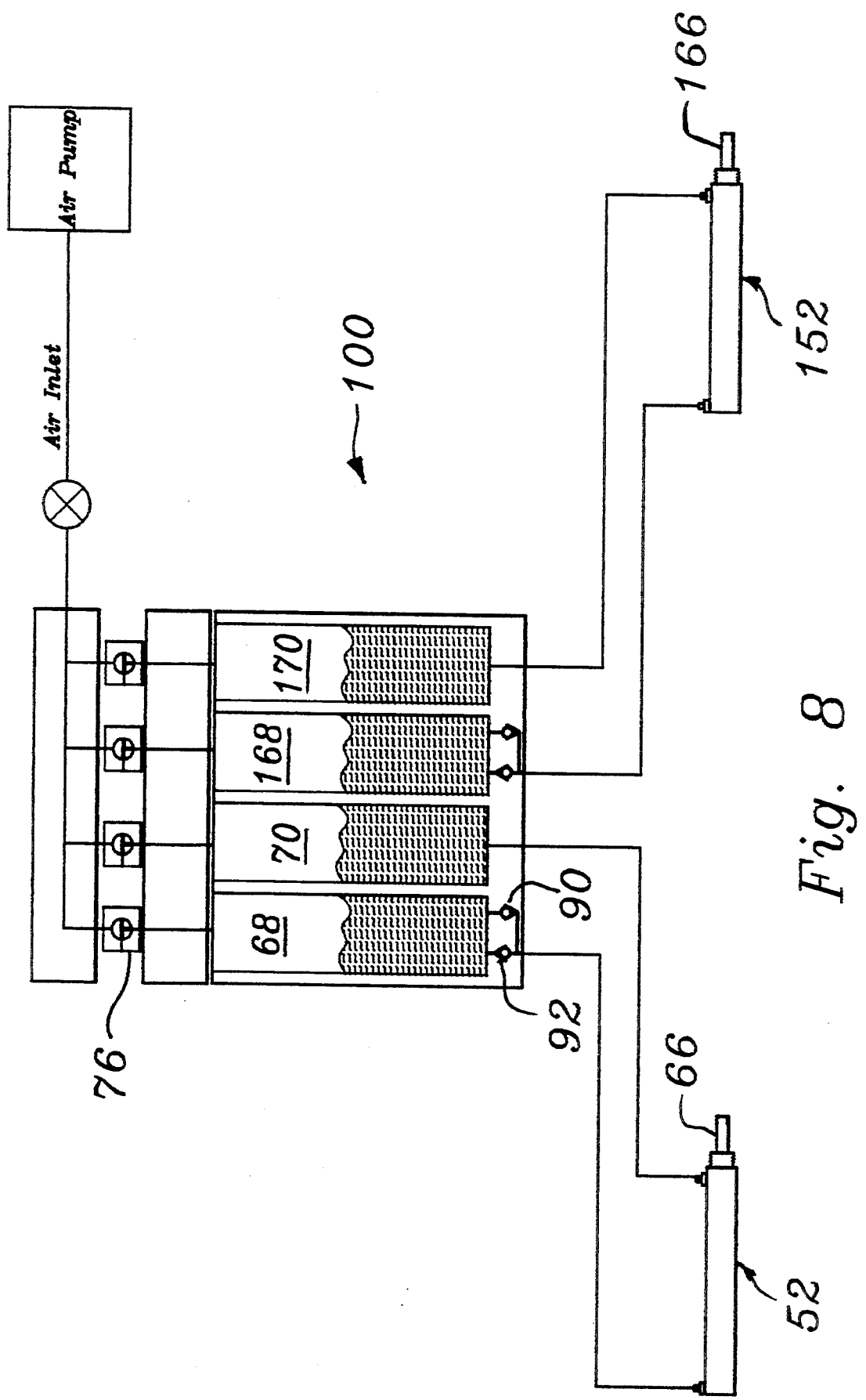
FIG. 8 is a schematic showing of an hydraulic system that has two hydraulic cylinders, such that the system might be used to pivot a member about two perpendicular axes.

Turning next to FIG. 8, a complete hydraulic system 100 for a four-way mirror assembly is shown. This larger system 100 is, of course, similar to the basic system shown in FIG. 7, except that it has two hydraulic cylinders instead of one, and there is a separate and independent set of two reservoirs for the second cylinder, etc. (New elements that are shown in this larger hydraulic system and which correspond to earlier-described elements are given a reference numeral that is the same as the original elements plus—100.) The second cylinder 152 is used to pivot the plate 44 about the generally horizontal axis 42. More specifically, the cylinder 152 moves the top of plate 44 in and out with respect to the structural base 26; this has the effect of causing the image that is visible to a driver to be perceived as moving up and down. The two sets of reservoirs 68/70 and 168/170 are shown closely grouped together, and this is the preferred manner of physically placing them in a mirror assembly; but it should be understood that they operate independently and there is no interconnection between them. Hence, it would be possible to space them apart, and to pressurize a given one of the two reservoirs in set 68/70 or a given one of the two reservoirs in set 168/170 without affecting the other three reservoirs. Too, compound movement of the reflective surface 40 (about two perpendicular axes) can be achieved by simultaneously pressurizing, say, reservoirs 68 and 168, or reservoirs 68 and 170, etc. After the desired amount of movement of the reflective surfaces has been achieved, the reservoirs and their associated chambers in the two cylinders are restored to essentially the same pressure—which is atmospheric pressure.

To foster compactness in the system 100, and to minimize the number of required parts, etc., a clearance hole is provided near the top and generally along the center line of the generally planar member 28, said hole providing space for the piston rod 166 to pass through the member—so that the distal end of the rod can be connected to plate 44. The cylinder 152 is located generally behind and is anchored to the generally planar member 28; and the hole has sufficient clearance around the rod 166 so that the plate 44 can be independently rotated (about horizontal axis 42) without any concurrent movement of the member 28.

The volume of liquid in a given one of the reservoirs will normally be established at about two to four times the maximum volume of a given chamber to which the reservoir is connected. This excess capacity provides plenty of hydraulic fluid in case a leak should occur in a cylinder or line. With regard to the possibility of leaks, no one likes to think that they will inevitably occur; but experience teaches us that they sometimes do. So it is believed to be prudent to design a system that can be given a "quick fix" by re-supplying any lost liquid while the vehicle is still on the road, leaving major repairs to later. To this end, the liquid that is selected for the hydraulic fluid is preferably one that can be obtained in most any truck stop or service station. Possibilities include engine oil, power steering fluid, transmission fluid, and antifreeze. Of these, antifreeze (i.e., ethylene glycol) has been found to be the preferred hydraulic fluid, because —for one reason—it is soluble in water. The use of compressed air as the pressurizing medium in the system, and the inevitable presence of moisture in that medium, means that whatever hydraulic liquid is used should be able to absorb at least some moisture from the air and still function. (The inherent nature of brake fluid to absorb water out of the air makes brake fluid a poor choice for a hydraulic fluid for this system, even though it is also readily available at truck stops and the like.) Furthermore, using ethylene glycol as the hydraulic fluid for the system provides the advantage of requiring little concern about having the system 100 freeze up when operations in frigid climates are necessary.

For simplicity, the electrically operated switch that an operator uses to actuate selected ones of the solenoid valves has been omitted from FIG. 8; but those skilled in the art will recognize that such a switch would be provided. It will also be recognized that the lower reflective surface 41, which is typically a convex mirror, has been shown as being mounted directly on the generally planar member 28, so that it will pivot about vertical axis 36 when member 28 is moved. (This is shown in FIG. 4.) This is definitely the preferred configuration, because it improves the driver's ability to see pertinent things both during linear travel and when executing a turn. Even casual observers who drive alongside large trucks can watch the bouncing of the round convex mirrors that are commonly mounted below rectangular truck mirrors of the prior art. And it surely doesn't take much imagination to figure out that a bouncing mirror will be of no benefit to a driver who is trying to watch both the road and traffic in front—while at the same time trying to watch what is happening alongside or behind the truck. When a truck is executing a turn, rotating a convex mirror in concert with a flat one permits the driver to observe the same relative "footprints" of the two mirrors at all times, so the driver's perception of what is happening adjacent the truck will inevitably be improved. Of course, it would be possible to mount a convex reflective surface 41 on a truck in the old fashioned way, by setting it at a fixed position and having it stay there at all times—although this is not preferred.

Another distinct advantage of the mirror assembly disclosed herein is that any reflective surface that is used is not integrally attached to some exotic part of the hydraulic system. Rather, the reflective surface 40 may be simply attached to the plate 44, and the reflective surface 41 may be attached to the generally planar member 28, with simple mechanical fasteners. Hence, if a reflective surface like surface 40 should break in a small town that had no large truck-repair facility (with a large inventory of spare parts), it is conceivable that a truck driver could go to any glass store in town and get a replacement mirror quickly cut to size. Replacement or the broken glass could then be accomplished by anyone with simple mechanical skills, using a screwdriver or dime, etc. And after the glass has been replaced, re-positioning a peripheral frame 38 around the glass and the plate 44 will return the assembly to full operational condition.

While only the preferred embodiment of a mirror assembly has been disclosed herein in great detail, it should be apparent to those skilled in the art that other embodiments could be created without departing from the spirit of the invention. For example, other features (such as heaters, wipers, lights, etc.) could be added, while features such as the convex lower mirror could be deleted (for economy and a reduction in the over-all weight). Too, the two hydraulic cylinders are illustrated as being horizontally oriented, with their respective piston rods being tied directly to the members that they rotate. If the front-to-rear space should for some reason be limited, it would be possible to orient the hydraulic cylinders vertically and then employ a bell crank or the like to effect horizontal movement of a particular member. However, the introduction of extra mechanical joints or connections between a piston and a rotatable member will inevitably increase the total of all clearances and tolerances in the system. And these extra clearances and tolerances can lead to more slack, which has a negative impact on the vibration damping that is achieved by placing the reflective surfaces in direct communication with reservoirs of incompressible liquid. Therefore, it is preferred that the piston rods be directly connected to the reflective surfaces—without any superfluous links, arms, rods, or connectors, if the structure to which the assembly is affixed is expected to experience significant vibration.

The check valves 90, 92 that have been described herein (from ADI Corporation) are conventional check valves, each having a small ball that is biased with a coiled spring against a chamfered seat in a brass housing. However, it would also be feasible to create integral check valves in the bottom of a housing that contains the reservoirs, by machining bores for the appropriate balls and springs directly into the reservoir housing.

Those skilled in the art will also recognize that the wrap-around shroud 21 shown in FIG. 1 could perhaps be replaced with some other protective or cosmetic member. But if a shroud or housing is chosen that offers less protection from direct wind loads, then the internal springs that are chosen for the check valves may need to be stronger—because a 3 psi cracking pressure may not be adequate to hold the reflective surface 40 so that it is stable in the presence of substantial wind loads.

Also, it should be remembered that there are applications other than large trucks where the desire for improved visibility can be satisfied with a mirror assembly as described herein. Those applications include both movable things like trains. tugs and cranes, as well as static things like buildings, etc. Attention should therefore be focused on the novelty of the total system and its various component parts, rather than the structure to which a system is attached. And it should be appreciated that the several facets of the invention should be understood to be limited only by the claims that are appended hereto.

What is claimed is:

1. A mirror construction characterized by having a reflective surface that is pivotable about two substantially divergent axes, comprising the combination of:
   a) a fixed base;
   b) a first generally planar member that is pivotable with respect to the base about a first axis;
   c) means for causing the first generally planar member to be selectively pivoted with respect to the fixed base;
   d) a second generally planar member affixed to and carried by the first generally planar member so as to pivot with respect to the fixed base when the first generally planar member is pivoted, and the second generally planar member having a reflective surface which renders it capable of functioning as a mirror, and the second generally planar member additionally being pivotable with respect to the first generally planar member about a second axis that is substantially divergent from the first axis; and
   e) means for causing the second generally planar member to be selectively pivoted with respect to the first generally planar member about the second axis.

2. The mirror construction as claimed in claim 1 wherein the first and second axes are substantially perpendicular.

3. The mirror construction as claimed in claim 1 wherein the first axis is adapted to be oriented in a generally vertical manner, and the second axis is generally horizontal when the first axis is generally vertical.

4. The mirror construction as claimed in claim 1 wherein the means for causing the second generally planar member to be selectively pivoted with respect to the first generally planar member includes a double-acting cylinder that is capable of being selectively pressurized in order to cause a rod to be moved linearly with respect to the cylinder, and wherein the double-acting cylinder is anchored to the first generally planar member and the rod extends through an aperture in the first generally planar member, and the rod has a distal end that is connected to the second generally planar member.

5. The mirror construction as claimed in claim 1 wherein the means for pivoting the first generally planar member with respect to the base includes a double-acting cylinder that is capable of being selectively pressurized in order to cause a rod to be moved linearly with respect to the cylinder, and the cylinder being anchored to the base, and the rod having a distal end that is connected to the first generally planar member.

6. The mirror construction as claimed in claim 1 wherein both the first and second generally planar members are caused to pivot by the selective pressurization of double-acting hydraulic cylinders, and the liquid that is used to pressurize the double-acting cylinders is selected from the group consisting of motor oil, power steering fluid, transmission fluid, and ethylene glycol.

7. The mirror construction as claimed in claim 1 wherein the first generally planar member is generally rectangular and hence has both long and short sides, and wherein the first generally planar member is connected to the base with a hinge device that extends along substantially the full length of one of the long sides of the generally planar member.

8. The mirror construction as claimed in claim 1 wherein the second generally planar member is generally rectangular and hence has both long and short sides, and wherein the second generally planar member is connected to the first generally planar member with a hinge that extends along one of the short sides of the second generally planar member.

9. The mirror construction as claimed in claim 1 and further including a second reflective surface that is attached to the first generally planar member for pivotal movement therewith, and said second reflective surface being mounted separately from the first reflective surface, and the first reflective surface being capable of being rotated with respect to the base without affecting the orientation of the second reflective surface.

10. The mirror construction as claimed in claim 9 wherein the second reflective surface is generally convex and is located below the first reflective surface.

11. A mirror assembly, comprising:
    a) a reflective surface that is supported with respect to a structure so as to be rotatable about two perpendicular axes;
    b) a pair of hydraulic cylinders, each of which is adapted to rotate the reflective surface about one of said perpendicular axes, and each cylinder being divided into two chambers by a piston, and further including a pair of extensible piston rods having pendant and distal ends, each of which rods is connected at its pendant end to a respective one of the two pistons, and each piston rod being connected at its distal end in such a way as to cause the reflective surface to rotate about one of the two perpendicular axes when its associated piston moves;
    c) a pair of reservoirs associated with each of the two hydraulic cylinders, and each of said four reservoirs containing an incompressible liquid, and each of the reservoirs being in communication with a respective one of the four chambers of the two hydraulic cylinders; and
    d) means for temporarily pressurizing at least one of the four reservoirs in order to cause the piston in one of the cylinders to move, whereby the reflective surface may be made to rotate about at least one of its two axes by pressurization of an appropriate one of the four reservoirs.

12. The mirror assembly as claimed in claim 11 wherein the two hydraulic cylinders and the four reservoirs are supported directly behind the reflective surface.

13. The mirror assembly as claimed in claim 11 wherein the means for temporarily pressurizing at least one of the four reservoirs includes:
 a) a source of pressurized gas; and
 b) means for selectively placing the source of pressurized gas in communication with a selected one of the four reservoirs, such that the selected reservoir will be pressurized and—in turn—will pressurize an associated chamber and cause a piston to move in the direction of the chamber that is not pressurized, whereby the reflective surface will be made to rotate.

14. The mirror assembly as claimed in claim 13 and further including means for reducing all of the chambers to essentially the same pressure after the reflective surface has been rotated to where it will provide a desired field of view to an observer.

15. The mirror assembly as claimed in claim 14 wherein the pressure to which all of the chambers are reduced after the reflective surface has been desirably rotated is essentially atmospheric pressure.

16. The mirror assembly as claimed in claim 11 wherein there is an hydraulic line extending between each of the reservoirs and a respective one of the four chambers, such that two of the reservoirs are in respective communication with two of the chambers in one cylinder, and the other two reservoirs are in respective communication with the other two chambers in the other cylinder, and further including a first pair of check valves interposed between one of the reservoirs and a chamber in one of the cylinder, and including a second pair of check valves interposed between another of the reservoirs and a chamber in the other cylinder, and both pairs of check valves comprising sets of two valves which are parallel but oppositely oriented, such that liquid flow through a given pair of check valves is permitted into and out of one of the chambers of a given cylinder when the inherent resistance of the check valve has been exceeded, and fluid flow through the other pair of check valves is permitted into and out of one of the chambers of the other cylinder when the inherent resistance of the check valves has been exceeded.

17. A mirror assembly, comprising:
 a) a reflective surface that is supported with respect to a structure so as to be rotatable about an axis;
 b) an hydraulic cylinder which is adapted to rotate the reflective surface about said axis, and the cylinder being divided into two chambers by a piston, and further including an extensible piston rod having pendant and distal ends, and the rod being connected at its pendant end to the piston and being connected at its distal end in such a way as to cause the reflective surface to rotate about its axis when the piston moves;
 c) a pair of reservoirs associated with the hydraulic cylinder, and each of the reservoirs containing an incompressible liquid, and each of the reservoirs being in communication with a respective one of the two chambers of the hydraulic cylinder; and
 d) means for temporarily pressurizing a selected one of the two reservoirs in order to cause the piston in the associated cylinder to move, whereby the reflective surface may be made to rotate in a desired direction about its axis by pressurization of an appropriate one of the two reservoirs.

18. The mirror assembly as claimed in claim 17 wherein the means for temporarily pressurizing a selected one of the two reservoirs constitutes a pneumatic system in which compressed air is admitted to the top of the reservoir that is to be pressurized.

19. The mirror assembly as claimed in claim 18 and further including valve means for returning both of the reservoirs to atmospheric pressure after the reflective surface has been moved to a desired orientation with respect to the structure.

20. A mirror assembly, comprising:
 a) a reflective surface that is supported with respect to a fixed structure, and the reflective surface being supported in such a way as to be rotatable at will about two perpendicular axes;
 b) hydraulic means for selectively rotating the reflective surface to a desired position and normally holding it in a static mode with respect to the fixed structure, said hydraulic means including reservoirs in communication with two hydraulic cylinders, and each of the hydraulic cylinders having a pair of chambers that are separated by a movable piston; and
 c) a plurality of check valves arranged in sets and interposed between the reservoirs and the chambers in the cylinders, and each set of check valves comprising two substantially similar valves which are in parallel but oppositely oriented, and each check valve having a resistance to liquid flow that is based upon a biasing force applied by an internal spring, such that liquid flow through a given pair of check valves is permitted into and out of one of the chambers of a given cylinder when the biasing resistance of the check valves has been exceeded, and fluid flow through another pair of check valves is permitted into and out of one of the chambers in the other cylinder when the biasing resistance of its check valves has been exceeded, such that a person may manually grab the reflective surface and apply a torque to it which is sufficient to overcome the biasing resistance of the check valves, whereby the reflective surface may be physically rotated by virtue of manually pushing on the reflective surface until the biasing resistance of the check valves has been overcome, and whereby the reflective surface may be manually moved to a desired position even if the hydraulic means has for some reason become inoperative.

21. The mirror assembly as claimed in claim 20 wherein one set of the oppositely oriented check valves is placed between one of the reservoirs and one of the two chambers of a given hydraulic cylinder, and the other chamber of said given hydraulic cylinder is in open communication with a different one of the reservoirs.

22. A mirror assembly comprising:
 a) a reflective surface that is rotatable with respect to a fixed structure about an axis;
 b) hydraulic means for causing the reflective means to rotate about its axis when pressurized, said means including a double-acting hydraulic cylinder having two chambers separated by a piston, and including a piston rod that is connected to the piston, and the piston rod extending between the reflective surface and the fixed structure, and further including a pair of reservoirs, each reservoir containing an incompressible liquid, with each of the reservoirs being in communication with a respective one of the two chambers; and c) means for temporarily applying a pressurized gaseous fluid from a source to a selected one of the two reservoirs, such that the selected one of the two reservoirs will be become pressurized and the chamber associated with the pressurized reservoir will also become pressurized, and such that the piston will be forced to move in the direction of the chamber that is not pressurized, and the reflective surface will be rotated in proportion to the amount of movement of the piston.

23. The mirror assembly as claimed in claim 22 wherein the means for temporarily applying a pressurized gaseous fluid to a selected one of the two reservoirs includes a pair of normally closed solenoid valves, each solenoid valve being interposed between a source of gaseous fluid and a respective one of the two reservoirs, and further including a normally-off/momentarily-on electrical switch connected to each of the solenoid valves.

24. The mirror assembly as claimed in claim 22 wherein the source of gaseous fluid constitutes a tank of compressed air on a wheeled vehicle, and the air tank being pressurized by an engine-driven air compressor on the wheeled vehicle.

25. A mirror assembly including a reflective surface that is adapted for attachment to a rigid structure, and the assembly being capable of being adjustably oriented by an operator in order that the operator might look at the reflective surface so as to obtain fields of view that he or she might not otherwise have by relying on a direct line of sight, and the reflective surface being occasionally subject to external forces that are not under the control of the operator, comprising:

a) a structural base configured for rigid attachment to a given structure;

b) a generally planar member mounted for rotation with respect to the structural base, said rotation being about a first axis;

c) a reflective surface carried by the generally planar member;

d) a first hydraulic cylinder extending between the structural base and the generally planar member, said hydraulic cylinder comprising a barrel having forward and rearward ends, and having a movable piston that divides the interior of the barrel into two chambers that are identifiable as forward and rearward chambers, and there being a movable piston rod connected at its pendant end to the piston and extending outwardly from the forward end of the barrel;

e) a first reservoir of hydraulic fluid that is in communication with the rearward chamber in the first hydraulic cylinder;

f) a second reservoir of hydraulic fluid that is in communication with the forward chamber in the first hydraulic cylinder;

g) means for selectively pressurizing a given one of the first and second reservoirs in order to cause longitudinal movement of the piston rod so as to thereby rotate the generally planar member about the first axis; and h) holding means for normally keeping the piston rod immobile after the generally planar member has been moved by an operator to a desired position, and said holding means being effective to resist the forces that would be transmitted to the piston rod by any small external forces that could be applied to the generally planar member, and said holding means being rendered temporarily ineffective in the event that a sufficiently large external force is applied to the generally planar member, and a small external force being one that introduces a pressure in one of the chambers of less than 3 pounds per square inch, and a sufficiently large external force being one that introduces a pressure in one of the chambers of more than 3 pounds per square inch.

26. The mirror assembly as claimed in claim 25 and further including means for returning the combination of the first and the second reservoirs and the cylinder to atmospheric pressure after the generally planar member has been moved to a desired position with respect to the structural base, such that the reservoirs and the cylinder need not remain pressurized after the generally planar member and its associated reflective surface have been rotated to a desired position with respect to the structure.

27. The mirror assembly as claimed in claim 25 wherein the structure to which the mirror assembly is attached is a vehicle, and wherein the operator is a driver of the vehicle, and the generally planar member is oriented so that the reflective surface functions as an external rearview mirror for the operator.

28. The mirror assembly as claimed in claim 25 wherein the holding means includes a pair of check valves in communication with a given one of the two hydraulic cylinders, and the check valves being in parallel but being respectively oriented in such a way that they restrict the flow of an hydraulic fluid in opposing directions.

29. The mirror assembly as claimed in claim 25 wherein there is a second axis that lies in approximately the same plane as the first axis but which is perpendicular to the first axis, and further including a plate that is pivotally attached to the generally planar member along the second axis, and including means for causing the plate to be selectively rotated about the second axis.

30. The mirror assembly as claimed in claim 29 wherein the means for causing the plate to be selectively rotated about the second axis includes a second hydraulic cylinder, and the second hydraulic also has two chambers that are separated by a piston, and there being a movable piston rod connected to said piston.

31. The mirror assembly as claimed in claim 30 wherein the piston rods are respectively connected to the generally planar member and the plate at locations such that the generally planar member can be rotated about a first and generally vertical axis by an angle of at least 30 degrees, and such that the plate can be rotated about a second and generally horizontal axis by an angle of at least 7 degrees.

32. The mirror assembly as claimed in claim 30 wherein the first and second hydraulic cylinders are independently operable, such that the plate and the generally planar member may be independently rotated about their respective axes.

33. The mirror assembly as claimed in claim 30 wherein both the first and the second hydraulic cylinders each have a generally horizontal orientation when installed on the structure, and there being an aperture in the generally planar member through which the piston rod of the second hydraulic cylinder extends, such that the plate may be independently moved with respect to the structural base regardless of the position of the generally planar member.

34. The mirror assembly as claimed in claim 25 wherein the means for selectively rotating the generally planar member about the first axis includes a gaseous means for pressurizing either the first or the second reservoirs, with pressurization of the first reservoir causing movement of the generally planar member in a first direction, and pressurization of the second reservoir causing movement in an opposite direction.

35. The mirror assembly as claimed in claim 34 wherein the structure is a vehicle that is propelled by an on-board engine, and the gaseous means of pressurizing the first reservoir includes a source of compressed air in communication with an air compressor that is operated by the vehicle's engine.

36. The mirror assembly as claimed in claim 25 and further including a second reflective surface carried by said generally planar member, and the second reflective surface being shaped differently than the first reflective surface, whereby the field of view available to the operator will be different in the two reflective surfaces.

37. The mirror assembly as claimed in claim 36 wherein the second reflective surface is convex and is located below the first reflective surface.

38. The mirror assembly as claimed in claim 37 wherein the second reflective surface is rigidly fixed to the generally planar member so as to be always movable therewith, and the first reflective surface is rigidly attached to the plate so as to be selectively pivoted with respect to the generally planar member about the second axis, whereby the second reflective surface may be left in a given position in order to present a given field of view to the operator while the first reflective surface is pivoted about the second axis in order to present a different field of view to the operator.

39. The mirror assembly as claimed in claim 25 wherein a liquid that is used in pressurizing the first hydraulic cylinder is selected from the group of liquids that are traditionally associated with modem engine-driven vehicles, said group consisting of engine oil, power steering fluid, transmission fluid, and ethylene glycol.

40. The mirror assembly as claimed in claim 25 wherein the liquid that is used in the first hydraulic cylinder is soluble in water, whereby the condensation of any water that might occur in the hydraulic cylinder as a result of temperature changes and exposure to compressed air will not tend to cause a failure of the hydraulic system.

41. The mirror assembly as claimed in claim 25 and further including a generally cavernous housing, and wherein all reservoirs, hydraulic cylinders and valves associated with a given mirror assembly are mounted interiorly of the housing, whereby the major operative parts of the mirror assembly are protectively located inside the housing at all times.

42. The method of selectively adjusting the orientation of a mirror assembly that is attached to the exterior of the cab of a large vehicle, said vehicle being of the class that includes class 8 trucks, buses, motor homes and tractor/trailer rigs, and the mirror assembly including a generally planar member that carries a reflective surface that is oriented so as to serve as a rearview mirror for the driver of the vehicle, such that the driver might obtain fields of view that he or she might not otherwise have by relying on a direct line of sight, including the steps of:

a) mounting the mirror assembly so that the reflective surface is capable of being selectively rotated with respect to the vehicle's cab by selectively pressurizing a given one of the two chambers of an hydraulic cylinder and thereby causing movement of an associated piston rod, said piston rod being connected to the generally planar member; and b) promptly returning the pressurized chamber of the hydraulic cylinder to atmospheric pressure after the reflective surface has been moved to a desired orientation; and c) stabilizing the reflective surface after it has been moved to a desired orientation by holding the generally planar member against unwanted movement as a result of certain external forces that may be applied to the generally planar member by any device other than said piston rod, wherein the stabilizing step includes placing one of the two chambers of an hydraulic cylinder in communication with a pair of parallel but oppositely oriented check valves which are in communication with a reservoir of hydraulic fluid at atmospheric pressure, said check valves serving as relief valves to permit liquid flow if and when a certain external force is applied to the generally planar member, such that the generally planar member may be physically moved by applying an external force directly to the generally planar member, thereby pushing fluid out of the cylinder through an appropriate check valve and into the reservoir, whereby there will be no damage to any part of the mirror assembly by manually pushing on the generally planar member.

* * * * *